(12) United States Patent
Salter et al.

(10) Patent No.: US 10,794,107 B2
(45) Date of Patent: Oct. 6, 2020

(54) VEHICLE DOOR ENTRY SYSTEM AND METHOD

(71) Applicant: Ford Global Technologies, LLC, Dearborn, MI (US)

(72) Inventors: Stuart C. Salter, White Lake, MI (US); Paul Kenneth Dellock, Northville, MI (US); Aaron Bradley Johnson, Allen Park, MI (US); James Kostrzewa, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 15/949,407

(22) Filed: Apr. 10, 2018

(65) Prior Publication Data

US 2019/0309563 A1   Oct. 10, 2019

(51) Int. Cl.
| | |
|---|---|
| *E05F 15/73* | (2015.01) |
| *E05F 15/611* | (2015.01) |
| *B60R 25/24* | (2013.01) |
| *B60Q 1/26* | (2006.01) |
| *G01V 8/12* | (2006.01) |
| *B60R 1/12* | (2006.01) |

(52) U.S. Cl.
CPC .......... *E05F 15/73* (2015.01); *B60Q 1/2665* (2013.01); *B60R 1/1207* (2013.01); *B60R 25/24* (2013.01); *E05F 15/611* (2015.01); *G01V 8/12* (2013.01); *B60R 2001/1223* (2013.01); *E05F 2015/765* (2015.01); *E05Y 2201/434* (2013.01); *E05Y 2400/32* (2013.01); *E05Y 2400/44* (2013.01); *E05Y 2400/858* (2013.01); *E05Y 2900/531* (2013.01)

(58) Field of Classification Search
CPC ...... E05F 15/73; E05F 15/611; B60Q 1/2665; B60R 1/1207; B60R 25/24; G01V 8/12
See application file for complete search history.

(56) References Cited

U.S. PATENT DOCUMENTS

| | | | |
|---|---|---|---|
| 8,091,280 B2 | 1/2012 | Hanzel et al. | |
| 9,475,369 B2 | 10/2016 | Sugiura et al. | |
| 9,637,088 B2 | 5/2017 | Ette et al. | |
| 9,741,184 B2 | 8/2017 | Iyer et al. | |
| 9,818,246 B2 | 11/2017 | Elie et al. | |
| 10,307,101 B1* | 6/2019 | Miller | A61B 5/7278 |
| 2008/0296926 A1* | 12/2008 | Hanzel | B60R 25/2054 |
| | | | 296/146.1 |
| 2016/0083995 A1* | 3/2016 | Dezorzi | E05F 15/73 |
| | | | 340/5.72 |
| 2016/0186480 A1* | 6/2016 | Krauss | E05F 15/73 |
| | | | 701/49 |

(Continued)

FOREIGN PATENT DOCUMENTS

JP   2013007171 A   1/2013

Primary Examiner — Nabil H Syed
(74) Attorney, Agent, or Firm — David Coppiellie; Price Heneveld LLP

(57) ABSTRACT

A door entry system for a vehicle is provided. The door entry system for a vehicle includes a door, an actuator, a puddle lamp generating light beam, a light sensor configured to sense reflected light from the light beam, and a controller processing a light signal generated by the light sensor and controlling activation of the actuator to open the door in response to sensing a user entering the beam of light.

15 Claims, 4 Drawing Sheets

(56) References Cited

U.S. PATENT DOCUMENTS

2016/0195430 A1    7/2016  Sticherling
2016/0265263 A1*   9/2016  Motoki ............... B60R 25/2054
2017/0028824 A1*   2/2017  Elie ....................... E05F 15/614
2017/0074009 A1*   3/2017  Banter ..................... E05B 81/77

* cited by examiner

VEHICLE DOOR ENTRY SYSTEM AND METHOD

FIELD OF THE INVENTION

The present invention generally relates to powered doors on a vehicle, and more particularly relates to automatic opening of a vehicle door based on a user input command.

BACKGROUND OF THE INVENTION

Automotive vehicles are typically equipped with vehicle side doors that allow access to the passenger compartment. The vehicle side doors are typically configured with an exterior door handle that is required to be actuated to unlatch a latch mechanism on the door and open the door by forcibly pulling to pivot the door about a hinge assembly. Some vehicle side doors may include a powered actuator such as a motor for opening and closing the door. The motor may be activated with an input switch or a remote control device, such as a key fob. It may be desirable to provide for an enhanced opening of a powered door of the vehicle, particularly for side doors that allow access to the driver and passenger seats.

SUMMARY OF THE INVENTION

According to one aspect of the present invention, a door entry system for a vehicle is provided. The door entry system includes a door, an actuator and a puddle lamp generating a puddle light. The door entry system also includes a light sensor configured to sense reflected light from the puddle light. The door entry system further includes a controller processing a light signal generated by the light sensor and controlling activation of the actuator to open the door in response to sensing a user entering the puddle light with a door open input command.

Embodiments of the first aspect of the invention can include any one or a combination of the following features:
 the controller detects distance of the user from the puddle lamp and activates the actuator further based on the distance being less than a predetermined value;
 the door entry system further includes a portable electronic device, wherein the controller determines the distance based on the electronic device;
 the electronic device comprises a key fob;
 the puddle lamp and the light sensor are located on a side view mirror assembly;
 the puddle lamp assembly and light sensor are mounted on a printed circuit board located within the side view mirror;
 the light sensor is located within a recessed tube outside of the puddle light to detect light reflected from a user;
 the recessed tube is offset from the puddle lamp and angled in a direction below the puddle lamp;
 the actuator comprises a motor; and
 the door comprises a pivoting door that pivots about a hinge assembly.

According to another aspect of the present invention, a vehicle door entry system is provided that includes a door, an actuator, and a puddle lamp generating a puddle light. The vehicle door entry system also includes a light sensor configured to sense reflected light from the puddle light. The vehicle door entry system further includes a controller processing a light signal generated by the light sensor and controlling activation of the actuator to open the door in response to sensing the reflected light from a user entering the puddle light with a door open command.

Embodiments of the second aspect of the invention can include any one or a combination of the following features:
 the puddle lamp and the light sensor are located on a side view mirror assembly;
 the light sensor is located within a tube outside of the puddle light to detect the reflected light reflected from a user;
 the tube is offset from the puddle lamp and angled in a direction below the puddle lamp; and
 the door comprises a pivoting door that pivots about a hinge assembly and the actuator comprises a motor.

According to a further aspect of the present invention, a method of opening a powered door on a vehicle is provided. The method includes the steps of activating a puddle lamp on the vehicle to generate a puddle light, sensing light reflected from the puddle light by a user, and detecting a door opening input by the user based on the sensed reflected light. The method further includes the step of activating an actuator to open the door in response to detecting the door opening input.

Embodiments of the third aspect of the invention can include any one or a combination of the following features:
 the method detects distance of the user from the puddle lamp and activates the actuator further based on the distance being less than a predetermined value;
 the method detects location of a portable electronic device and determines the distance based on location of the electronic device;
 the electronic device comprises a key fob; and
 the step of detecting a door opening input comprises a detecting a rapid rise in the signal followed by a substantially level signal followed by a rapid fall in the signal.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
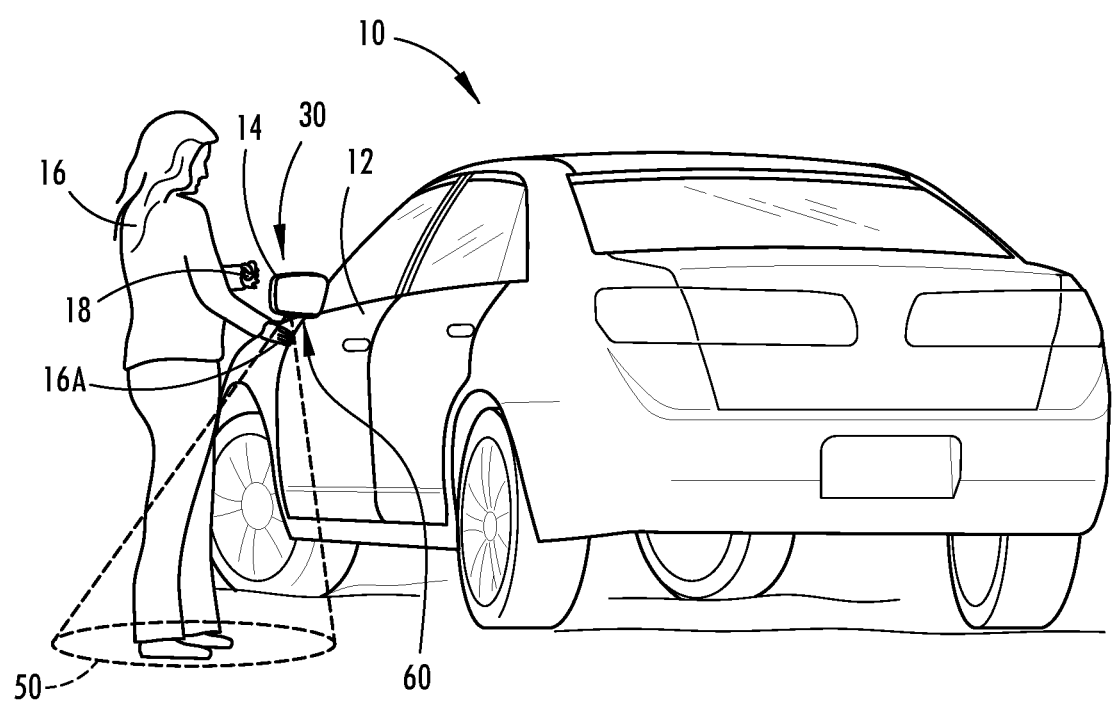
FIG. 1 is a side perspective view of a motor vehicle showing a puddle lamp and a user inputting a door open command to a door entry system, according to one embodiment.
Figure 2:
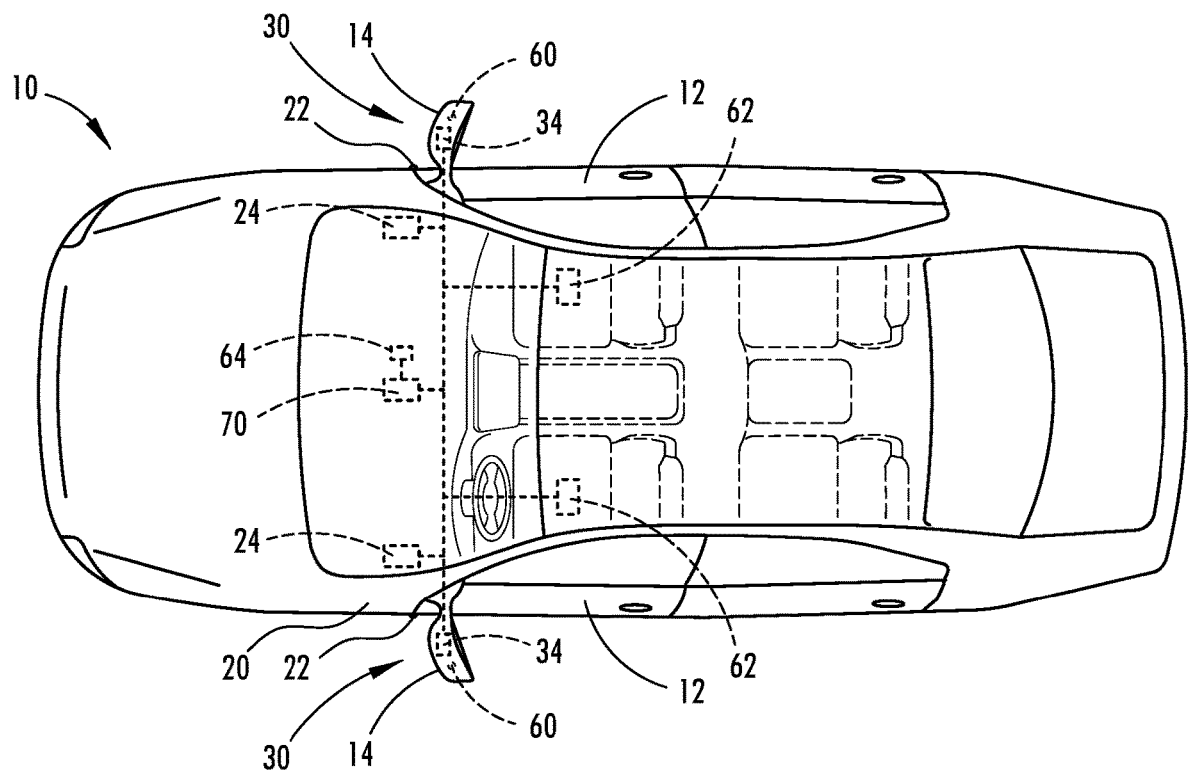
FIG. 2 is a top view of the motor vehicle further of FIG. 1 showing the vehicle door entry system having powered side entry doors that open when commanded and a puddle lamp in each side view mirror assembly.

Referring now to FIGS. 1 and 2, a wheeled motor vehicle 10 is generally illustrated having a vehicle door entry system 30, according to one embodiment. The vehicle 10 may be configured as a car, truck, van, SUV, or other vehicle having one or more powered doors for accessing the vehicle interior. The motor vehicle 10 is shown as a passenger vehicle having a vehicle body 20 and front side doors 12 connected thereto located on opposite lateral sides of the vehicle 10. The side doors 12 include front doors that pivot about a hinge assembly 22 between an open position that exposes an opening in the vehicle body 20 to allow access to the passenger compartment and a closed position that closes the opening in the vehicle body 20. In the open position, the door 12 allows access to the passenger compartment of the vehicle 10 such as entry and exit of a driver or passenger to and from the seating arrangement. Each of the front side doors 12 includes an actuator, such as an electric motor 20, generally located near the hinge assembly 22 for actuating the corresponding door 12 between the open and closed positions. The hinge assembly 22 connects the corresponding door 12 to the vehicle body 20. It should be appreciated that the powered doors may otherwise be configured to pivot in different directions or to slide or otherwise move between open and closed positions. It should further be appreciated that the rear side doors may likewise have actuators to open and close the doors similar to activation of the front side doors.

The vehicle 10 may include one or more seat occupancy sensors 62 for detecting the occupancy of the respective seats as occupied or unoccupied seats. The seat occupancy sensors 62 may be configured as weight sensors, capacitive sensors or other sensors. Additionally, the vehicle 10 may include a controller 70, such as a body control module for receiving various inputs, processing the inputs with one or more routines and generating control outputs. A day/night sensor 64 may be installed on the vehicle 10 to sense environment lighting conditions such as nighttime or daytime lighting conditions.

The vehicle 10 is shown having first and second exterior side view mirror assembly 14 located on opposite left and right sides of the vehicle on the exterior sides of the respective front side doors 12. Each side rearview mirror assembly 14 generally includes a mirror on the rearward facing side for allowing the seated driver to view rearward looking side views of the vehicle 10. The vehicle 10 has a vehicle door entry system 30 that includes a puddle lamp generally shown located within the side view mirror housing 14 for generating a puddle light 50 shown in one embodiment as a cone-shaped beam of light directed downwards generally towards the ground. The puddle lamp 60 generates the puddle light 50 as an output light illumination directed onto the ground surface adjacent to the door 12 in a region where a passenger typically stands on the ground when entering or exiting the vehicle 10 as seen in FIG. 1.

The vehicle door entry system 30 uses a light sensor to sense light reflected by a user entering the puddle light 50, generally in close proximity to the sensor, such as within a distance of 25 cm, and more particularly within a distance of 10 cm. A controller processes a light signal generated by the light sensor and determines when the user entering the puddle light 50 inputs a door open command based on the sensed light signal. The door open command may be input by a user extending a hand into the puddle light 50 within a distance such as 25 cm from the sensor. The controller further controls activation of the actuator (e.g., motor 20) to open the door 12 in response to sensing the user entering the light beam 50 with an intended door open command.

The user 16 may have a portable electronic device such as a key fob 18 in his or her possession which generates a signal that may be processed by the controller to determine a distance of the user in possession of the key fob 18 from the puddle lamp 60 and light sensor. When a user 16 with a key fob 18 approaches the vehicle within a predetermined distance of the puddle lamp 60, such as three meters, or more particularly, within a distance of one meter, for example, the puddle lamp 60 is activated to output the puddle light 50. With the puddle lamp 60 activated, a user may extend a body part, such as a hand, into the puddle light 50 of the puddle lamp 60 to input a door open command that activates the actuator to open the corresponding door without further user action required. It should be appreciated that other portable electronic devices such as smartphones, watches, radios and other devices may be used to determine the distance or location of a user in possession of the electronic device, according to other embodiments.

Figure 3:
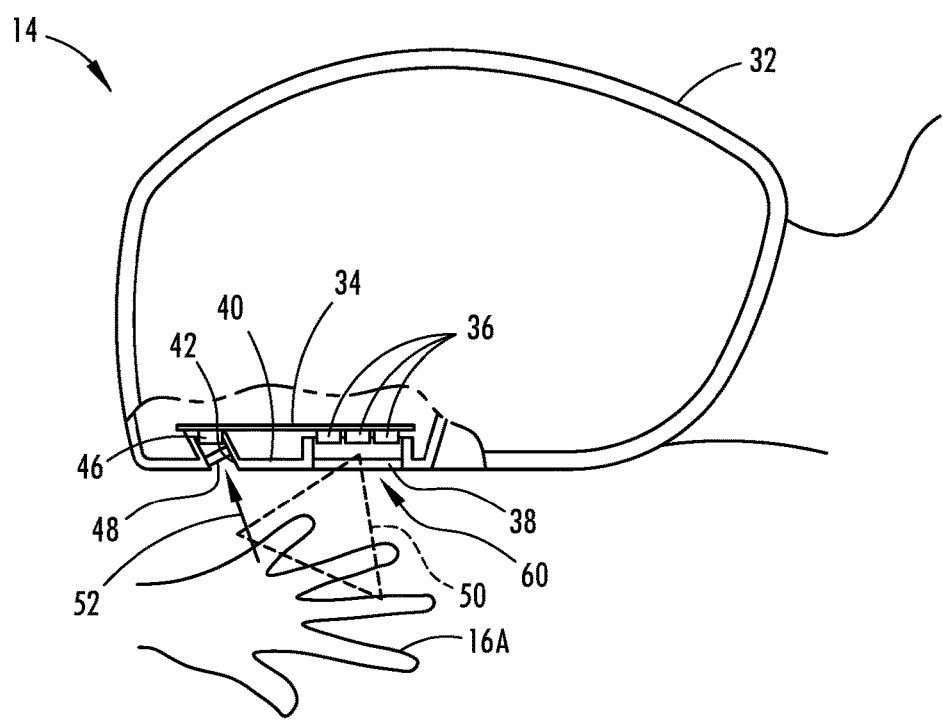
FIG. 3 is a rear partial cutaway view of one of the side view mirror housings further illustrating components of the vehicle door entry system.

The vehicle door entry system 30 is further illustrated generally having the puddle lamp, light sensor, and controller generally located within the rearview mirror assembly 14 in FIG. 3. The rearview mirror assembly 14 includes a housing 32 shown having a cover 40 generally extending over an opening along the bottom side of the housing 32 with various components including the puddle lamp 60 and light sensor 46 located in the opening. The puddle lamp 60 is oriented light output downward to generate the puddle light 50 passing through first opening in the cover 40. The light sensor 46 is also oriented light sensing downward and configured to detect reflected light from the puddle light 50 directed through a second opening in the cover 40 and generate a light signal that is processed to determine whether a sensed door open input command has been detected. The vehicle door entry system 30 includes the puddle lamp 60 having a light source shown as a plurality of light emitting diodes (LEDs) 36. In all, three LEDs 36 are illustrated in the embodiment shown. The LEDs 36 are located on the bottom side of a printed circuit board 34 which is located within the housing 32. In addition, the light sensor 46 is also located on the bottom side of the printed circuit board 34. The bottom side of the printed circuit board 34 is oriented downward such that the puddle light 50 illuminates downward towards the ground adjacent to the door.

The light sensor 46 may include a phototransistor for detecting light intensity. The light sensor 46 is located within a recessed tube 42 that is offset from the beam 50 of light output from the LEDs 36 of the puddle lamp 60 and is angled in a direction towards the bottom thereof. A lens 48 is disposed in front of the light sensor 46 to transmit reflected light from the puddle light 50 onto the sensor 46. Similarly, a lens 38 is located at the output side of the light source 36 to generate a focused light beam as the puddle light 50. When the puddle lamp 60 is activated, the puddle light 50 is generated by the LEDs 36. When a user is within a predetermined distance of the puddle lamp 60 and places an object, such as a hand, within the puddle light 50 in close proximity thereto, light is reflected from the hand and redirected into the recessed tube 42 and the reflected light is sensed by light sensor 46. The light sensor 46 generates a sensed light signal that is processed to determine if the object, such as hand, is inputting a door open command.

Figure 4:
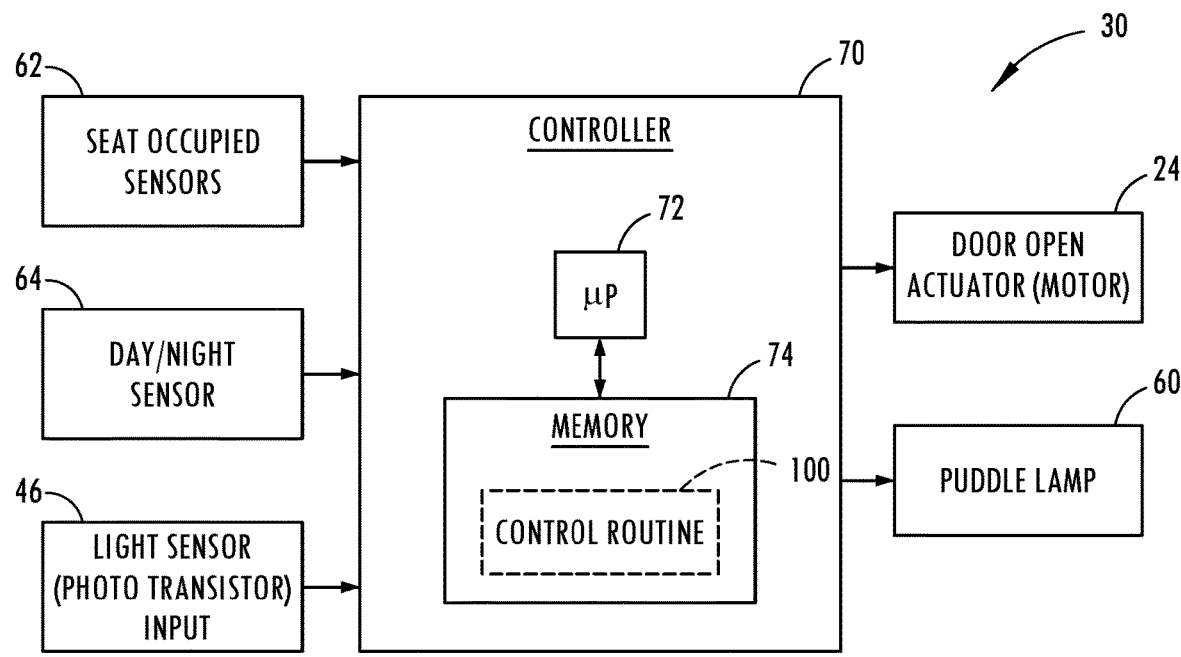
FIG. 4 is a block diagram illustrating a control system for controlling the vehicle door entry system.

Referring to FIG. 4, the vehicle door entry system 30 is illustrated having a controller 70 which may include the body control module that provides shared controls on the vehicle 10 or may include a dedicated controller configured to control the door entry system 30. The controller 70 may include a microprocessor 72 and memory 74 for storing one or more control routines 100 which may be executed by the microprocessor 72 or may include other analog and/or digital circuitry. The controller 70 receives signals from the seat occupied sensors 62 located on various seats in the vehicle 10. In addition, controller 70 receives a day/night sensor 64 indicative of the sensed day or night lighting conditions. The controller 70 further receives the signal from the light sensor 46 to detect whether or not a user is interacting with the puddle lamp to provide a door open command. The controller 70 processes the various inputs and controls outputs including the puddle lamp 60 and one or more door open actuators 24 for actuating one or more doors to the open position.

Figure 5:
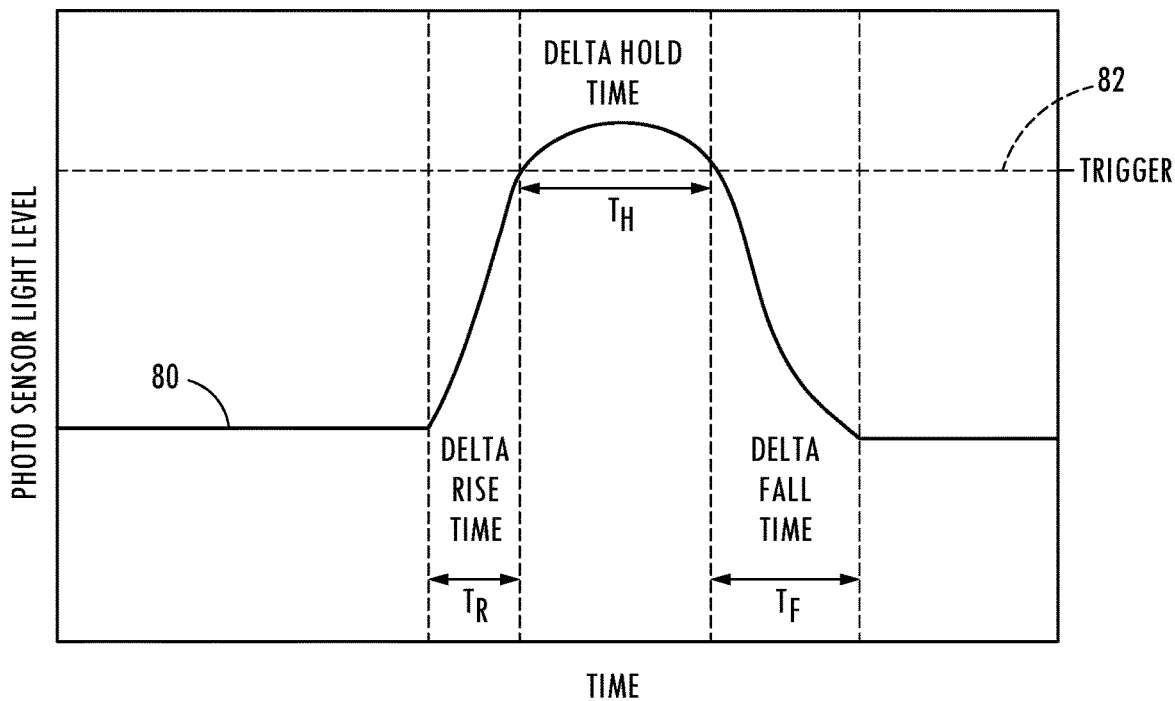
FIG. 5 is a graph illustrating the light signal sensed from a reflection of the puddle light during a sensed door open command, according to one example.

The light sensor 46 is positioned in close proximity to the puddle lamp 60 to detect light reflected from the puddle light 50 that was output by the puddle lamp 60 and reflected by an object. The light sensor 46 includes a phototransistor, according to one embodiment, that detects a light signal level, such as is shown in FIG. 5 during a user input door open command. The light sensor 46 generates the sensed light signal 80 which is a low signal level when there is no user entering the light beam near the sensor 46, and thus no door open input command sensed. The sensed light signal 80 rises with a rapid rise over a delta rise time TR upon receiving a door open input command from a user placing their hand in close proximity to the sensor and within the puddle light 50. The hand placement is close to the puddle lamp 60 and the light sensor 46 such as within a distance of 25 cm, or more preferably within a distance of 10 cm. The sensed light signal is then shown at a high substantially stable value above a trigger value over a period delta hold time $T_H$ before experiencing a rapid fall with a delta fall time $T_F$ back down to a low value when the user's hand is removed from the puddle light 50. The controller 70 detects a user input command for a door open activation by detecting a quick rise in the light signal, followed by a flattened signal for hold time $T_H$ above the trigger level, followed by a rapid fall in the signal, and determines that the door command is for an open door command based on the sensed light signal pattern. When an open door command is received, the controller 70 then activates a door motor to actuate the corresponding door to the open position.

Figure 6:
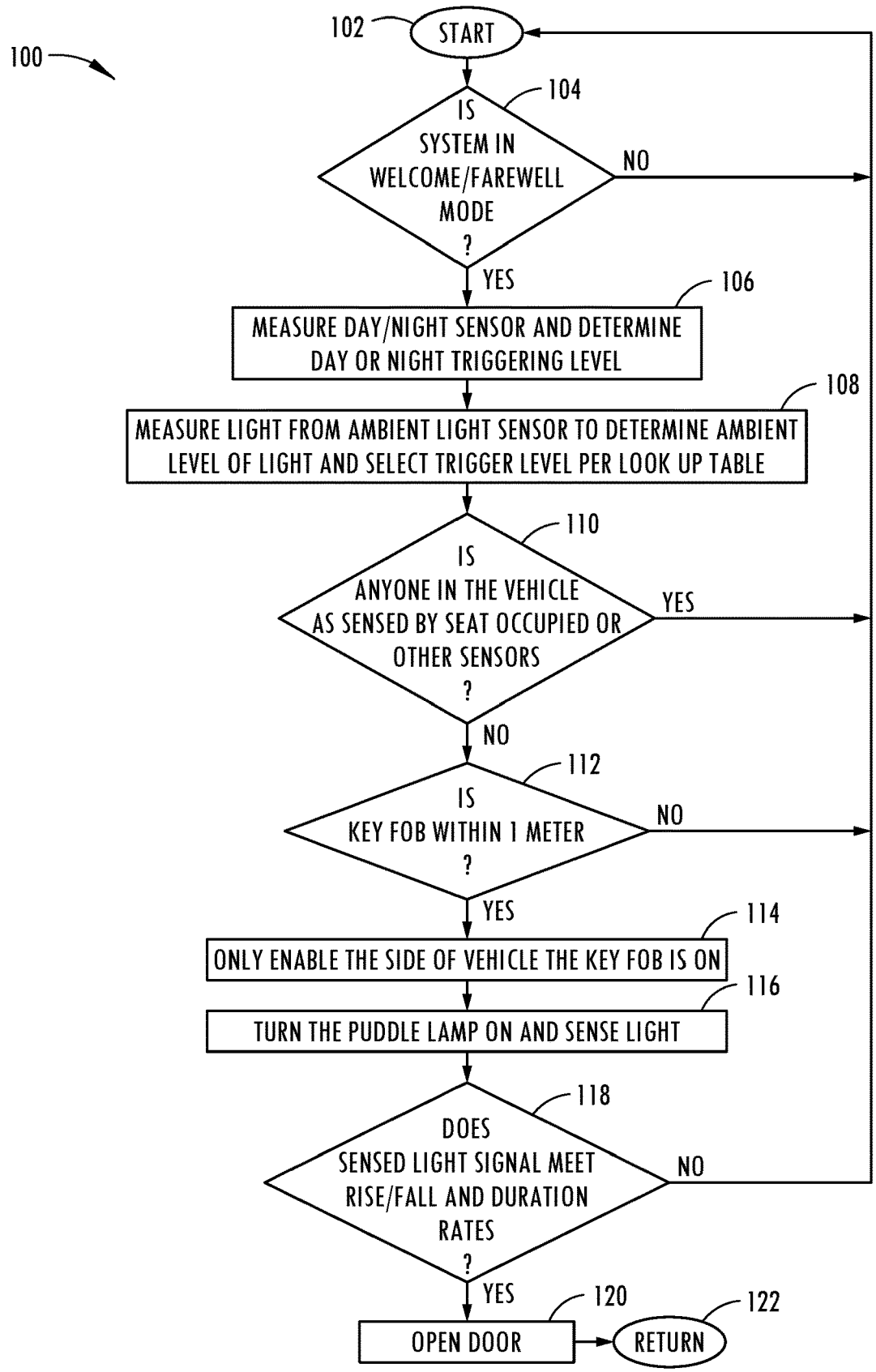
FIG. 6 is a flow chart illustrating a routine for controlling actuation of the vehicle door with the vehicle door entry system.

The control routine 100 is illustrated in FIG. 6 for sensing a door open command and actuating the door to the open position, according to one embodiment. Routine 100 begins at step 102 and proceeds to step 104 to determine if the vehicle door entry system is in a welcome/farewell mode and, if not, returns to step 102. The welcome/farewell mode is a mode in which the vehicle is awaiting entrance or exiting of one or more passengers. When in the welcome/farewell mode, routine 100 proceeds to step 106 to measure lighting with the day/night sensor and determine a day or night triggering level. Next, at step 108, routine 100 measures the ambient light using the light sensor 46 to determine the ambient level of light and selects a trigger level for determining a sensed door open command from a lookup table. Proceeding to decision step 110, routine 100 determines if anyone is seated in the vehicle as sensed by the seat occupancy sensors or other sensors. If there are one or more occupants detected in the vehicle, routine 100 returns to step 102. If there is no one sensed seated within the vehicle, routine 100 proceeds to decision step 112 to determine if the key fob is within a certain distance, such as one meter, from the puddle lamp and, if not, returns to step 102. If the key fob is detected within one meter of the puddle lamp, routine 100 proceeds to step 114 to only enable the side of the vehicle that the key fob is detected on, and then proceeds to step 116 to turn the puddle lamp on and to sense light with the light sensor on the enabled side of the vehicle. At decision step 118, routine 100 determines whether the sensed light signal meets the rise/fall in duration rates indicative of a user commanded door open command. If no door command is received, routine 100 returns to step 102. If a user commanded door open command is determined, routine 100 proceeds to step 120 to actuate the motor to open the door before returning at step 122.

Accordingly, the vehicle door entry system 30 advantageously detects a user input door open command using the puddle lamp 60 of the vehicle 10 and commands the door associated with that puddle lamp to the open position. This allows for a user to open a vehicle door without having to actuate the door latch or to reach for a key fob input. The vehicle door entry system 30 advantageously employs a puddle lamp on the vehicle to sense the user commanded input. It should be appreciated that the vehicle door entry system 30 and the puddle lamp may be located elsewhere on the vehicle such as in the door handle, according to other embodiments.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A door entry system for a vehicle, comprising:
   a door;
   an actuator;
   a puddle lamp generating a puddle light;
   a light sensor configured to sense reflected light from the puddle light, wherein the light sensor is located within a recessed tube outside of the puddle light to detect reflected light reflected from a user, and wherein the recessed tube is offset from the puddle lamp and angled in a direction below the puddle lamp; and
   a controller processing a light signal generated by the light sensor and controlling activation of the actuator to open the door in response to sensing the user entering the puddle light with a door open input command within a distance of 25 cm of the puddle lamp and light sensor, wherein the door open input command is detected by detecting a rapid rise in the sensed reflected light, followed by a substantially level sensed reflected light, followed by a rapid fall in the sensed reflected light.

2. The door entry system of claim 1, wherein the controller detects distance of the user from the puddle lamp and activates the actuator further based on the distance being less than a predetermined value.

3. The door entry system of claim 2 further comprising a portable electronic device, wherein the controller determines the distance based on the electronic device.

4. The door entry system of claim 3, wherein the electronic device comprises a key fob.

5. The door entry system of claim 1, wherein the puddle lamp and the light sensor are located on a side view mirror assembly.

6. The door entry system of claim 5, wherein the puddle lamp and light sensor are mounted on a printed circuit board located within the side view mirror assembly.

7. The door entry system of claim 1, wherein the actuator comprises a motor.

8. The door entry system of claim 1, wherein the door comprises a pivoting door that pivots about a hinge assembly.

9. A vehicle door entry system, comprising:
a door;
an actuator;
a puddle lamp generating a puddle light;
a light sensor configured to sense reflected light from the puddle light, wherein the light sensor is located within a tube outside of the puddle light to detect the reflected light reflected from a user, and wherein the tube is offset from the puddle lamp and angled in a direction below the puddle lamp; and
a controller processing a light signal generated by the light sensor and controlling activation of the actuator to open the door in response to sensing the reflected light from the user entering the puddle light with a door open command within a distance of 25 cm of the puddle lamps and light sensor, wherein the door open input command is detected by detecting a rapid rise in the sensed reflected light, followed by a substantially level sensed reflected light, followed by a rapid fall in the sensed reflected light.

10. The vehicle door entry system of claim 9, wherein the puddle lamp and the light sensor are located on a side view mirror assembly.

11. The vehicle door entry system of claim 9, wherein the door comprises a pivoting door that pivots about a hinge assembly and the actuator comprises a motor.

12. A method of opening a powered door on a vehicle, comprising:

activating a puddle lamp on the vehicle to generate a puddle light;
sensing with a light sensor light reflected from the puddle light by a user, wherein the light sensor is located within a recessed tube outside of the puddle light to detect the light reflected from the user, and wherein the recessed tube is offset from the puddle lamp and angled in a direction below the puddle lamp;
detecting a door opening input by the user based on the sensed reflected light within a distance of 25 cm of the puddle lamp and light sensor, wherein the step of detecting the door opening input comprises detecting a rapid rise in the sensed reflected light, followed by a substantially level sensed reflected light, followed by a rapid fall in the sensed reflected light; and
activating an actuator to open the door in response to detecting the door opening input.

13. The method of claim 12, further comprising detecting distance of the user from the puddle lamp and activating the actuator further based on the distance being less than a predetermined value.

14. The method of claim 12 further comprising detecting location of a portable electronic device and determining the distance based on location of the electronic device.

15. The method of claim 14, wherein the electronic device comprises a key fob.

* * * * *